US012603828B2

(12) United States Patent
Dikshit et al.

(10) Patent No.: US 12,603,828 B2
(45) Date of Patent: Apr. 14, 2026

(54) SELECTIVE PROGRAMMING OF FORWARDING HARDWARE IN A MULTI-FABRIC OVERLAY NETWORK

(71) Applicant: Hewlett Packard Enterprise Development LP, Spring, TX (US)

(72) Inventors: Saumya Dikshit, Bangalore (IN); Suresh Kumar Reddy Beeram, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/506,650

(22) Filed: Nov. 10, 2023

(65) Prior Publication Data

US 2025/0158913 A1      May 15, 2025

(51) Int. Cl.
H04L 45/02 (2022.01)
H04L 12/46 (2006.01)
H04L 45/748 (2022.01)

(52) U.S. Cl.
CPC .......... H04L 45/02 (2013.01); H04L 12/4633 (2013.01); H04L 45/748 (2013.01)

(58) Field of Classification Search
CPC ............................ H04L 45/02; H04L 12/4633
See application file for complete search history.

(56) References Cited

U.S. PATENT DOCUMENTS

| 10,841,216 B1 | 11/2020 | Hoang et al. |
| 2021/0385149 A1* | 12/2021 | Suryanarayana ....... H04L 12/66 |
| 2022/0407798 A1 | 12/2022 | Holness et al. |

FOREIGN PATENT DOCUMENTS

| CN | 108600073 A | 9/2018 | |
| WO | WO-2016154401 A1 * | 9/2016 | ......... H04L 12/4641 |
| WO | WO-2022206397 A1 * | 10/2022 | ........... H04L 45/745 |

OTHER PUBLICATIONS

Georges, J., "Arista EOS—BGP Selective Route Download," Dec. 28, 2015, https://arista.my.site.com/AristaCommunity/s/article/arista-eos-bgp-selective-route-download.

(Continued)

*Primary Examiner* — Hua Fan
(74) *Attorney, Agent, or Firm* — Yao Legal Services, Inc.

(57) ABSTRACT

A network device in a first fabric of an overlay network is provided. During operation, the network device can receive a route advertisement from a border device via which the network device communicates outside of the first fabric. The network device can determine, based on an indicator in the route advertisement, whether a host route associated with a host coupled to a second fabric of the overlay network is included in the route advertisement. If the indicator indicates that the host route is included in the route advertisement, the network device can store the host route in a data structure on the network device. The network device can also program, in the local forwarding hardware, a prefix route associated with the host route. If the network device detects a packet destined to the host device, the network device can program the host route in the forwarding hardware.

20 Claims, 7 Drawing Sheets

(56)                    References Cited

OTHER PUBLICATIONS

Hewlett Packard Enterprise Development LP, "Aruba Intelligent Forwarding (FIB) commands," AOS-CX 10.11 Command-Line Interface Guide, 6300, 6400 Switch Series, Chapter 9, Apr. 2023, pp. 212-217, <https://www.arubanetworks.com/techdocs/AOS-CX/10.11/PDF/cli_6300-6400.pdf>.

Mohamed, H. et al., "Protocol Based Selective FIB Download for Distributed Forwarding Architecture," Dec. 2012, GC'12 Workshop: Second Int'l Workshop on Rural Communications, pp. 7-12.

Sajassi et al., "BGP MPLS-Based Ethernet VPN", Internet Engineering Task Force (IETF), Request for Comments: 7432, Feb. 2015, 56 pages.

Cisco Systems, Inc., "BGP Control Plane", Apr. 26, 2016, Cisco Dynamic Fabric Automation Configuration Guide, book chapter, <https://www.cisco.com/c/en/us/td/docs/switches/datacenter/dfa/configuration/b-dfa-configuration/bgp-control-plane.html>, pp. 1-18.

E. Rosen, "IANA Registries for BGP Extended Communities", Internet Engineering Task Force (IETF), Request for Comments: 7153, Mar. 2014, 16 pages.

Rabadan et al., "IP Prefix Advertisement in Ethernet VPN (EVPN)", Internet Engineering Task Force (IETF), Request for Comments: 9136, 2021, pp. 1-31.

Sajassi et al., "Integrated Routing and Bridging in Ethernet VPN (EVPN)", Internet Engineering Task Force (IETF), Request for Comments: 9135, 2021, pp. 1-30.

Sangli et al., "BGP Extended Communities Attribute", Internet Engineering Task Force (IETF), Request for Comments: 4360, 2006, 12 Pages.

* cited by examiner

SELECTIVE PROGRAMMING OF FORWARDING HARDWARE IN A MULTI-FABRIC OVERLAY NETWORK

BACKGROUND

Field

A network device may support different protocols and services in a network. For example, the network device can support one or more protocols in a heterogeneous multi-layer network, such as an overlay network.

BRIEF DESCRIPTION OF THE FIGURES

In the figures, like reference numerals refer to the same figure elements.

DETAILED DESCRIPTION

Figure 1:
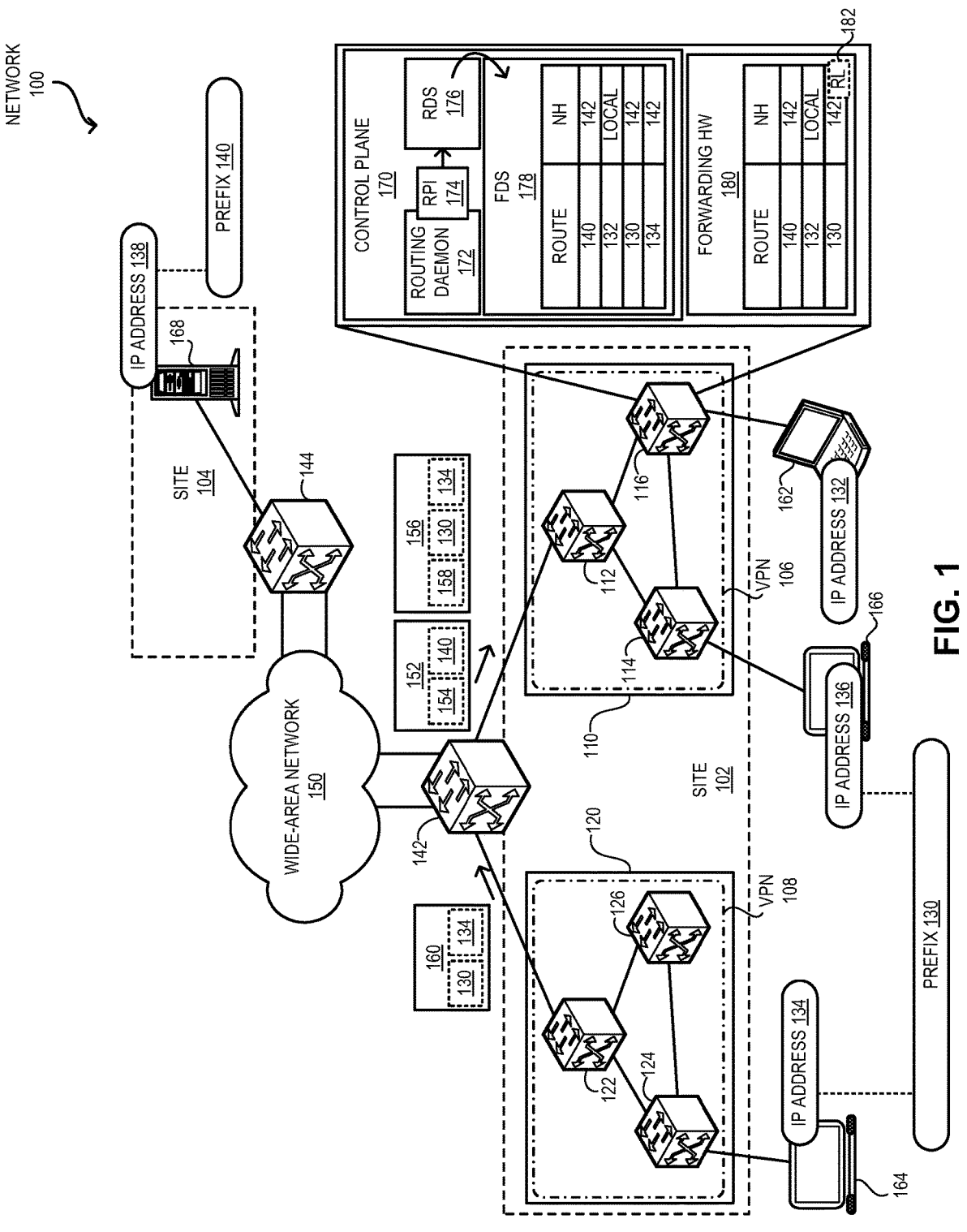
FIG. 1 illustrates an example of selective programming of the forwarding hardware of a network device in a multi-fabric overlay network, in accordance with an aspect of the present application.

A network can facilitate data exchange for a variety of applications running on physical and virtual devices. Such applications have brought a progressively increasing amount of network traffic. As a result, network devices, such as switches, are often built with versatile capabilities. A network device may support different protocols and services. Furthermore, the network device can participate in different types of networks while operating in different roles. For example, the network device can operate as a participating switch in a distributed virtual switch (DVS) where a plurality of participating switches can operate in conjunction with each other to operate as a single virtual switch. While operating as a participating switch in a DVS, the network device can also operate as an access switch that connects end devices (or user devices) to the network.

The network device can be deployed in a heterogeneous multi-layer network, such as an overlay network. The overlay network can be formed based on tunneling and virtual private networks (VPNs). The network device can then encapsulate a respective packet received from a client device with a tunnel header and forward it to another network device via a tunnel based on a corresponding Internet Protocol (IP) address. The tunnels can be formed based on the overlay routing for a VPN over the tunnels, such as an Ethernet VPN (EVPN), that can be deployed as an overlay over a set of virtual extensible local area networks (VXLANs). The network devices in the overlay network can use overlay-route packets (e.g., EVPN "type 2" and "type 5" route updates) to notify each other regarding route updates. To deploy a VPN over the tunnels, a respective tunnel endpoint may map a respective client virtual local area network (VLAN) to a corresponding tunnel network identifier (TNI), which can identify a virtual network for a tunnel. For example, if the tunnel is formed based on VXLAN, the TNI can be a virtual network identifier (VNI) of a VXLAN header, and a tunnel endpoint can be a VXLAN tunnel endpoint (VTEP).

The aspects described herein address the problem of efficiently programming routes in forwarding hardware of network devices in a multi-fabric overlay network by (i) including an indicator, which indicates the presence of a host route, in the overlay-route packets for notifying other switches; (ii) if an overlay-route packet includes a host route, programming a corresponding prefix route in the forwarding hardware while maintaining the host route in a forwarding data structures; and (iii) programming the host route in the forwarding hardware from the forwarding data structures if corresponding inter-host communication is initiated. When a network device learns a host route from another fabric of the overlay network, the network device can maintain the host route in the control plane (e.g., in the software). The network device can efficiently utilize the hardware resources by programming the host route in the forwarding hardware if communication that uses the host route is initiated.

A distributed tunnel fabric in an overlay network can be coupled to other networks via the gateway device, which can include a DVS, of the fabric. Typically, at least two network devices can operate as a single device in conjunction with each other to facilitate the DVS. Network devices participating in the DVS can be referred to as participating devices. A respective participating device can consider the other participating devices as peer participating devices (or peer switches). A respective pair of participating devices can be coupled to each other via an inter-switch link (ISL). The DVS can be associated with one or more virtual addresses (e.g., a virtual IP address and/or a virtual media access control (MAC) address). A respective tunnel formed at the DVS can use the virtual address to form the tunnel endpoint. As a result, other tunnel endpoints (i.e., other network devices) of the fabric can consider the DVS as the other tunnel endpoint for a tunnel instead of any of the participating devices. Even though a network device in a distributed tunnel fabric may not be a To forward traffic toward the DVS, a respective network device in the fabric can perform a load balancing operation (e.g., based on hashing on a respective packet) and select one of the participating devices as the destination (i.e., as the other tunnel endpoint). The network device can then forward the packet via a tunnel between the tunnel endpoints. Hence, an endpoint may forward a multicast control packet to one of the participating devices, which, in turn, can share the control packet with a peer participating device via the ISL. If the fabric is in a multi-fabric overlay network, the fabric can be one of a plurality of fabrics forming the overlay network. A respective fabric can then include a gateway device, which can include a DVS, that can be coupled to a remote gateway device of another fabric, an external network, or both.

For example, the gateway device can be coupled to the remote gateway device via an inter-fabric tunnel (i.e., a tunnel coupling two fabrics). A packet received at the gateway device via an intra-fabric tunnel (i.e., a tunnel within a fabric) can be encapsulated with a tunnel header associated with the intra-fabric tunnel. The gateway device can decapsulate the tunnel header and re-encapsulate the packet with another tunnel header associated with the inter-fabric tunnel. A respective network device operating as a tunnel endpoint in the fabric can use a routing protocol, such as Border Gateway Protocol (BGP). In a multi-fabric overlay network, routes for intra-fabric tunnels can be determined by using internal BGP (iBGP) while the routes for inter-fabric tunnels can be determined by using external BGP (eBGP).

A multi-fabric overlay network may be distributed across multiple sites. For example, if the network is for an enterprise, the sites can correspond to different office sites distributed across the globe. However, if a site is large, or sites are adjacent to each other, there can be multiple fabrics deployed close to each other. These fabrics are often coupled to each other and the external network (e.g., a wide-area network or WAN) via a shared network device, which can be a border device in the WAN. Since the border device can be shared among a plurality of fabrics, these fabrics can also be referred to as sharing fabrics. The same border device can support external communication for the sharing fabrics.

Typically, hosts, which can be user or client devices, need to be authenticated to connect to a VPN (e.g., based on an authentication process). Examples of hosts can include, but are not limited to, laptops, desktops, printers, cellphones, tablets, Internet of Things (IoT) devices, and appliances. With existing technologies, a host can be coupled to a network device in the fabric for accessing the fabric. The network device can then authenticate the host from an authentication server based on the authentication process, such as port-based or username/password-based authentication. The port-based authentication can be based on the Institute of Electrical and Electronics Engineers (IEEE) 802.1X standard. Based on the successful authentication, the access switch can determine a host type and allocate a VLAN to the host based on the host type.

Subsequently, the host can obtain an IP address belonging to a subnet associated with the VLAN. However, the VLAN can be configured across multiple network devices. As a result, the corresponding subnet can be distributed among the network devices, each of which can be reachable via one or more tunnels in the fabric. This process of distributing a subnet across the tunnels of an overlay network can be referred to as subnet stretching. To facilitate subnet stretching, a respective network device can learn the route to a respective host, which can be referred to as a host route. The network device can also program the host route into the local forwarding hardware (e.g., the application-specific integrated circuit (ASIC) of the network devices). For example, the forwarding hardware can include one or more ternary content-addressable memory (TCAM) units. A respective host route and the corresponding next-hop device (e.g., a next-hop switch) can be stored in an entry of the TCAM.

A plurality of hosts can be in a subnet stretched across a set of network devices. A respective network device can then learn the subnet prefix (e.g., a prefix route) with the set of network devices as the next-hop devices. The network device can run a routing protocol instance (e.g., a routing daemon) to learn a respective route. For example, if a fabric uses BGP to establish routes, the BGP instance on the access switches can determine respective routes to the hosts. If equal-cost multi-path routing (ECMP) is enabled for the routing protocol, each of the set of network devices can be programmed as a next-hop device for the prefix route in the forwarding hardware. Otherwise, one of the network devices can be selected as the next-hop device by the routing protocol and programmed accordingly. However, the selected next-hop device may not provide the shortest path to all the hosts of the subnet.

To avoid the inefficient selection of next-hop devices, the network devices typically learn host routes in addition to the prefix routes. The host route can be based on the IP address of a host and include an identifier of the access switch via which the IP address is reachable. For example, if a host's IP address is A.B.C.D, the prefix and host route can be A.B.C.0/24 and A.B.C.D/32, respectively. The host route can also indicate the network device coupling the host as the next-hop device. Due to the network device coupling hosts belonging to different subnets, the number of host routes learned and programmed by the network device can be up to the total number of hosts in the overlay network (e.g., across multiple fabrics). As a result, a large number of host routes can be programmed into the forwarding hardware of the network device. However, in a typical distributed network, traffic flows among hosts are rare and short-lived. Nonetheless, the host routes occupy the limited resources available at the forwarding hardware without being utilized.

In the overlay network, when a new route is discovered, the route is shared among the network devices of the overlay network. To save hardware resources, host routes associated with the hosts might not be programmed in the hardware of a network device unless there is traffic between hosts (i.e., between the IP addresses of the hosts). This process of programming a host route when used in the forwarding hardware can be referred to as selective programming of the host route. However, if a host route is advertised from outside of a fabric, the corresponding host can be coupled to another fabric of the overlay network. Such a host route is advertised via a border device (e.g., a gateway device) of the fabric. The gateway device may also advertise routes reachable via the gateway device, such as routes to a subnet of a remote site.

To ensure communication from outside of the fabric, the selective programming of host routes can be disabled for the routes advertised by the gateway device. Consequently, routes advertised by the gateway device can be programmed in the forwarding hardware. As a result, in a multi-fabric network, when host routes from remote fabrics are received via the gateway device, they are programmed in the forwarding hardware of the network device even when there is no data flow among the hosts. Consequently, the limited hardware resources of the network device are inefficiently utilized.

To address this issue, the overlay-route packets distributed in the overlay network can include an indicator that allows the network devices to determine whether to program a host route in the forwarding hardware even if they are received from a gateway device. For example, the overlay-route packet can be an EVPN route update (e.g., a network layer reachability information (NLRI)) and the dedicated fields can be an extended community defined for the EVPN route updates. The community can carry a number of routes (e.g., a prefix route and a host route). The community can also include an indicator, such as a bit, that can indicate whether selective programming is applicable to the advertised routes. Accordingly, if the bit is set, a receiving network device can apply selective programming to the advertised routes.

Because a host's IP address is allocated from a subnet spanning the overlay network, a corresponding subnet or prefix route typically accompanies the host route advertised in the overlay network. As a result, when a border device sends an overlay-route packet advertising a host route, the border device can also include a corresponding prefix route in the packet. Among the sharing fabrics in an overlay network, a border device can relay the packet to the network devices in a fabric upon receiving the packet from another fabric. The border device can determine that the host route is to be relayed to a network device in a sharing fabric. The border device can then set the indicator, which indicates that the host route included in the packet is accompanied by a prefix route.

As a result, when a network device receives the packet from the border device, the network device can determine, based on the indicator, that selective programming can be applied to the host route in the packet. Accordingly, the network device can store the host route in a forwarding data structure (FDS) maintained in the control plane. For example, the FDS can be the forwarding information base (FIB) maintained by the routing daemon, which can run the routing protocol instance, of the network device. Furthermore, the network device can store the prefix route in the FDS and program the prefix route into the forwarding hardware of the network device. The prefix route associated with a host can be programmed with a rule for the data plane. The rule can indicate that if the destination IP address of a packet matches the prefix, the IP address should be looked up in the FDS in the control plane.

When the host route associated with the IP address is identified in the FDS, the network device can program the host route in an entry in the forwarding hardware (e.g., a ternary content-addressable memory or TCAM entry). The network device can also initiate a timer for the entry and forward subsequent packets of the flow based on the entry of the forwarding hardware. Even though the destination IP address of these packets can also match the prefix route, the host route can provide the longest-prefix match in the data plane. Upon determining a respective match for the host route in the data plane, the timer can be reset. If the forwarding hardware does not observe traffic for the IP address for a predetermined period, the timer can expire. The forwarding hardware can then remove the entry from the forwarding hardware.

On the other hand, when the border device receives an overlay-route packet from another fabric (e.g., from another site), the border device may only distribute the prefix route. Under such circumstances, the border device may not set the indicator in an overlay-route packet. When a network device receives the packet from the gateway device, the network device can determine, based on the indicator, that selective programming is not applicable to the advertised prefix route. Accordingly, the network device can store the prefix route in the FDS and program the prefix route into the forwarding hardware of the network device. However, the prefix route is programmed in the forwarding hardware without the rule. In this way, the forwarding hardware at a network device can selectively program a host route when needed and efficiently utilize the limited resources (e.g., available space) in the forwarding hardware.

In this disclosure, the term "switch" is used in a generic sense, and it can refer to any standalone network device or fabric device operating in any network layer. "Switch"

should not be interpreted as limiting examples of the present invention to layer-2 networks. Any device that can forward traffic to an external device or another switch can be referred to as a "switch." If the switch is a virtual device, the switch can be referred to as a virtual switch.

Furthermore, if a network device facilitates communication between networks, the network device can be referred to as a gateway device. Any physical or virtual device (e.g., a virtual machine or switch operating on a computing device) that can forward traffic to an end device can be referred to as a "network device." Examples of a "network device" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of selective programming of the forwarding hardware of a network device in a multi-fabric overlay network, in accordance with an aspect of the present application. An overlay network 100 can include a number of network and end devices, and may include heterogeneous network components, such as layer-2 and layer-3 hops, and tunnels. In some examples, network 100 can be an Ethernet, InfiniBand, or other networks, and may use a corresponding communication protocol, such as Internet Protocol (IP), FibreChannel over Ethernet (FCOE), or other protocol. Network 100 can be distributed among multiple sites 102 and 104, which can be different sites of an enterprise network. Network 100 can include a plurality of distributed tunnel fabrics 110 and 120 at site 102. Hence, network 100 can be a multi-fabric network. Fabric 110 can include network devices 112, 114, and 116; and fabric 120 can include network devices 122, 124, and 126. A respective network device in a respective fabric can be associated with a MAC address and an IP address. In a respective fabric of network 100, network devices can be coupled to each other via a tunnel.

In FIG. 1, a link denoted with a solid line between a pair of network devices can indicate a tunnel. Network devices of a respective fabric in network 100 may include one or more meshes of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), Multiprotocol Label Switching (MPLS), and Generic User Datagram Protocol (UDP) Encapsulation (GUE). The tunnels in a fabric can be formed over an underlying network (or an underlay network). The underlying network can be a physical network, and a respective link of the underlying network can be a physical link. A respective pair of network devices in the underlying network can be a Border Gateway Protocol (BGP) peer. A VPN 106, such as an EVPN, can be deployed over fabric 110. Similarly, a VPN 108 can be deployed over fabric 120.

Network devices 112 and 122 can be gateway devices for fabrics 110 and 120, respectively. One or more of network devices 112 and 122 can be DVS. Multiple switches can operate as a single switch in conjunction with each other to facilitate the DVS. The participating switches can operate as a single switch in conjunction with each other to facilitate the DVS. The DVS can be associated with one or more virtual addresses (e.g., a virtual IP address and/or a virtual MAC address). A respective tunnel formed at the DVS can use the virtual address to form the tunnel endpoint. To efficiently manage data forwarding, the participating network devices can maintain an ISL between them for sharing control and/or data packets. The ISL can be a layer-2 or layer-3 connection that allows data forwarding. The ISL can also be based on a tunnel (e.g., a VXLAN tunnel).

A border device 142 can be shared among fabrics 110 and 120. Hence, border device 142 can facilitate external communication from site 102 via a wide-area network (WAN) 150. Network 100 can also include border device 144 which can facilitate communication with border device 142 via network 150. For example, border devices 142 and 144 can facilitate communication between sites 102 and 104 via network 150. In network 100, border device 142 can be coupled to border device 144 via respective inter-fabric tunnels through network 150. However, because border device 142 can be a shared device, border device 142 can be coupled to fabrics 110 and 120 (e.g., via network devices 112 and 122, respectively) via respective inter-fabric tunnels.

A packet between fabrics 110 and 120 can be received at network device 112 via an intra-fabric tunnel within fabric 110 and can be encapsulated with a tunnel header associated with the intra-fabric tunnel. Network device 112 can decapsulate the tunnel header and re-encapsulate the packet with another tunnel header associated with the inter-fabric tunnel. Upon receiving the packet, border device 142 can decapsulate the tunnel header and re-encapsulate the packet with another tunnel header associated with the intra-fabric tunnel to send the packet to network device 122. Network device 122 can then decapsulate the tunnel header and re-encapsulate the packet with another tunnel header associated with the intra-fabric tunnel to fabric 120. To facilitate the forwarding of the packet, routes for intra-fabric tunnels can be determined using iBGP, and routes for inter-fabric tunnels be determined using eBGP.

Network devices 114 and 116 can facilitate access to fabric 110 to a number of hosts, such as hosts 166 and 162, respectively. Similarly, network device 124 can facilitate access to fabric 120 to host 164. Examples of hosts can include, but are not limited to, laptops, desktops, printers, cellphones, tablets, IoT devices, and appliances. Hosts 162, 164, and 166 can be allocated with IP addresses 132, 134, and 136, respectively. A host 168, which is associated with IP address 138, can be deployed in site 104. Host 168 can be accessible via border device 144. In this example, IP addresses 134 and 136 can belong to prefix 130, and IP address 138 can belong to prefix 140. If host 164's IP address 134 is A.B.C.D, prefix 130 can then be A.B.C.0/24. Since prefix 130 can represent its corresponding subnet, prefix 130 and subnet 130 can be used interchangeably.

In network 100, the routing protocol instance of a respective network device, such as routing protocol instance 174 of network device 116, can learn the host routes to respective hosts. During operation, routing protocol daemon (or routing daemon) 172 of network device 116 can run in control plane 170 since routing is a control plane operation of a network device. Control plane 170 can run on the operating application (e.g., the network operating system) of network device 116. Routing daemon 172 can run a routing protocol instance 174 (e.g., a BGP instance) to learn a respective route. Routing daemon 172 can then store the learned routes in a routing data structure (RDS) 176. A respective entry of RDS 176 can include a route (e.g., a prefix) and a next-hop device associated with the route.

Typical routes learned using routing protocol instance 174 can mostly include prefix routes. For example, since border device 142 advertises prefix routes for external devices (i.e., devices reachable via WAN 150), routing protocol instance 174 may not learn a host route associated with IP address 138. In addition, routing protocol instance 174 can also learn the prefix routes associated with hosts 162, 164, and 166. For a respective route, routing daemon 172 can also determine one or more entries for FDS 178. A respective entry in FDS 178 can include a route and a next-hop device associated with a route.

In network 100, when a new route is discovered, the route is shared among the network devices of network 100. To save hardware resources, network device 116 may not program host routes associated with hosts coupling fabric 110 in forwarding hardware 180. For example, network device 116 may not program the host route associated with host 166 in forwarding hardware 180 unless there is traffic to host 166 from network device 116. To ensure communication from outside of fabric 110, the selective programming of host routes can be disabled for the routes advertised by border device 142. Consequently, routes advertised by border device 142 can be programmed in forwarding hardware 180. As a result, when a host route associated with host 164 from fabric 120 is received via border device 142, network device 142 may program the host route in forwarding hardware 180 (e.g., in a TCAM entry) even when there is no traffic to host 164. The host route can be referred to as host route 134 as it is represented by IP address 134. Because host route 134 might be programmed in forwarding hardware 180, it's the limited resources can be inefficiently utilized.

To address this issue, the overlay-route packets distributed in network 100 can include an indicator that allows network device 116 to determine whether to program host route 134 in forwarding hardware 180 even if it is received from border device 142. The overlay-route packet can be an EVPN route update. The EVPN route update can include route types two and five for host and prefix routes, respectively. The overlay-route packet can then include an extended community defined for the EVPN route updates. The community can carry a number of routes (e.g., a prefix route associated with prefix 130 and host route 134). The prefix route can be referred to as prefix route 130 since it is represented by prefix 130. The community can also include an indicator, such as a bit, that can indicate whether selective programming is applicable to the advertised routes. Accordingly, if the bit is set, a receiving network device of network 100 can apply selective programming to the advertised routes.

Because the subnet indicated by prefix 130 can span fabrics 110 and 120, host route 134 can be accompanied by prefix route 130 in an overlay-route packet 160 from network device 124. When border device 142 receives packet 160 from fabric 120, border device 142 can determine that the route advertisements in packet 160 are to be relayed to fabric 110. Accordingly, border device 142 can generate an overlay-route packet 156. Border device 142 can include prefix route 130 and host route 134 in packet 156. Border device 142 can also include indicator 158 in packet 156. Border device 142 can set the value of indicator 158 (e.g., a value of "1"), which can indicate that selective programming can be applicable to host route 194.

As a result, when network device 116 receives packet 156 from border device 142, network device 116 can determine, based on indicator 158, that selective programming can be applied to host route 134. Accordingly, network device 116 can store host route 134 in FDS 178. In addition, network device 116 can store prefix route 130 in FDS 178 and program prefix route 130 into forwarding hardware 180 (e.g., in a TCAM entry). Prefix route 130 can be programmed in forwarding hardware 180 with a rule 182. Rule 182 can indicate that if the destination IP address of a packet matches IP address 134, the IP address should be looked up in FDS 178 in control plane 170.

On the other hand, when border device 142 receives an overlay-route packet with route advertisement associated with host 168 via WAN 150, border device 142 may only distribute prefix route 140, which represents prefix 140, in site 102. Border device 142 can generate an overlay-route packet 152 comprising prefix route 140 and an indicator 154. Under such circumstances, border device 142 may not set the bit representing indicator 154. Consequently, indicator 154 can have a value of "0" in packet 152. When network device 116 receives packet 152 from border device 142, network device 116 can determine, based on indicator 152, that selective programming is not applicable to prefix route 140. Accordingly, network device 116 can store prefix route 140 in FDS 178 and program prefix route 140 into forwarding hardware 180. However, prefix route 140 is programmed in forwarding hardware 180 without a rule.

Moreover, based on indicators 154 and 158, routing daemon 172 can differentiate the prefixes learned from fabrics 110 and 120, and external routes via border device 142. Accordingly, when network device 116 receives a route advertisement relayed advertisement from fabric 120 via border device 142, routing daemon 172 can determine the route as a route from a sharing fabric based on the set indicator 158. Alternatively, routes received from an external network, such as WAN 150, can be indicated by the unset indicator 154. If the host associated with a host route is reachable via border device 142, the next-hop device can indicate border device 142. For example, because host 162 is coupled to network device 116, the entry for host route 132 can include "LOCAL" as the next-hop device in both FDS 178 and forwarding hardware 180. In this way, forwarding hardware 180 can selectively program a host route when needed and efficiently utilize the limited resources (e.g., available space) in forwarding hardware 180.

Figure 2:
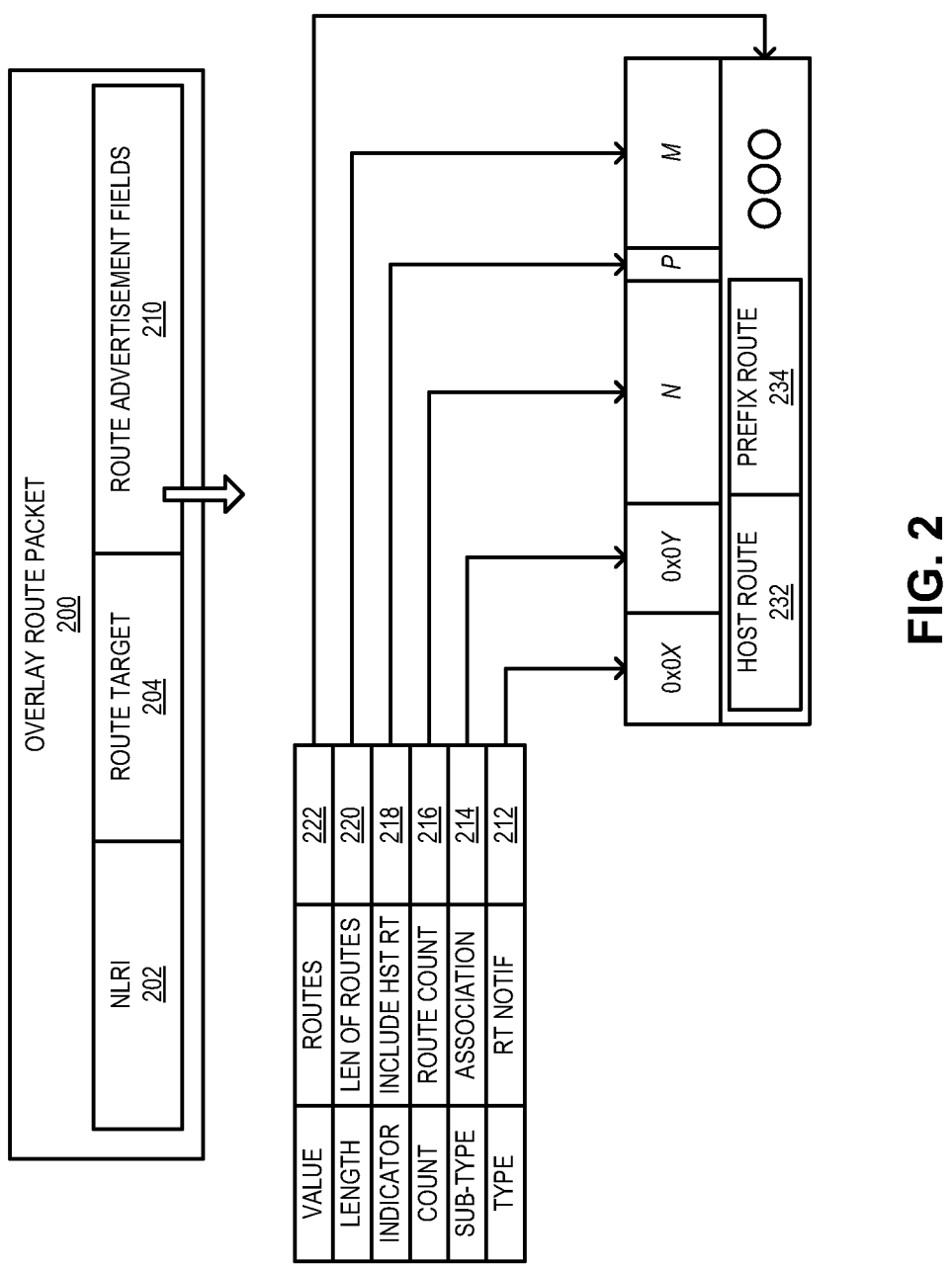
FIG. 2 illustrates an example of an overlay-route packet for notifying routes in an overlay network, in accordance with an aspect of the present application.

FIG. 2 illustrates an example of an overlay-route packet for notifying routes in an overlay network, in accordance with an aspect of the present application. An overlay-route packet 200, such as an EVPN "type 2" or "type 5" route update, can be used to advertise an EVPN NLRI 202. NLRI 202 may correspond to an Inclusive Multicast Ethernet Tag (IMET) route. Packet 200 can also include a route target 204 extended community to indicate the VPN membership of the advertised prefixes (i.e., the prefix routes). Route target 204 can be based on IP addresses or autonomous system (AS) numbers. Packet 200 can also include a set of route advertisement fields 210. Fields 210 can represent a BGP Extended Communities Attribute, as defined in Internet Engineering Task Force (IETF) Request For Comments (RFC) 4360.

Fields 210 can include a set of sub-fields representing the indicator and one or more routes advertised by a network device. The set of sub-fields can include a type 212, a sub-type 214, a route count 216, an indicator 218, a length of routes 220, and routes 222 advertised by packet 200. Type 212 can indicate the generic type of field that can be defined in accordance with the standard (e.g., the BGP Extended Communities Attribute) associated with fields 210. To indicate the transitive nature of fields 210, a predetermined bit (e.g., the bit next to the most significant bit (MSB)) of a specialized value 0x0X of type 212 can be "0." Sub-type 214 can be a specialized value 0x0Y indicating that fields 210 can be associated with one or more routes. Specialized value 0x0Y of sub-type 214 can be selected from an undefined value indicated in RFC 4360.

Route count 216 can indicate the number of routes, N, included in packet 200. In This way, route count 216 can allow a receiving network device to expect N routes in packet 200 and parse packet 200 accordingly. Indicator 218 can be included in a sub-field at a predefined location in the EVPN extended community. Indicator 218 can indicate whether a host route is included in packet 200 can be represented by a bit, P. If routes 222 includes a host route 232 and a corresponding prefix route 234, P can be set (i.e., P=1). The set value of P can indicate that packet 200 is advertising routes associated with a host coupling a sharing fabric and hence, selective programming is applicable to routes 222. On the other hand, if P is unset (i.e., P=0), routes 222 can include a prefix route 234 without host route 232. Accordingly, packet 200 can then advertise routes from an external location (e.g., a remote site reachable via a WAN) and hence, selective programming is not applicable to routes 222.

Length of routes 220 can indicate the length of a respective route in routes 222. Length 220 can provide flexibility to advertise different types of routes, such as IP version 4 and version 6 routes, using fields 210. However, within the same packet 200, each of routes 222 may have the same length. Based on route count 216 and length 220, a receiving network device can parse routes 222 and obtain each route. For example, if route count 216 is 2 and length 220 is X bytes, the network device can obtain the first X bytes as one route and the next X bytes as the second route. In this way, packet 200 can facilitate efficient and selective programming of routes distributed in a multi-fabric overlay network.

Figure 3:
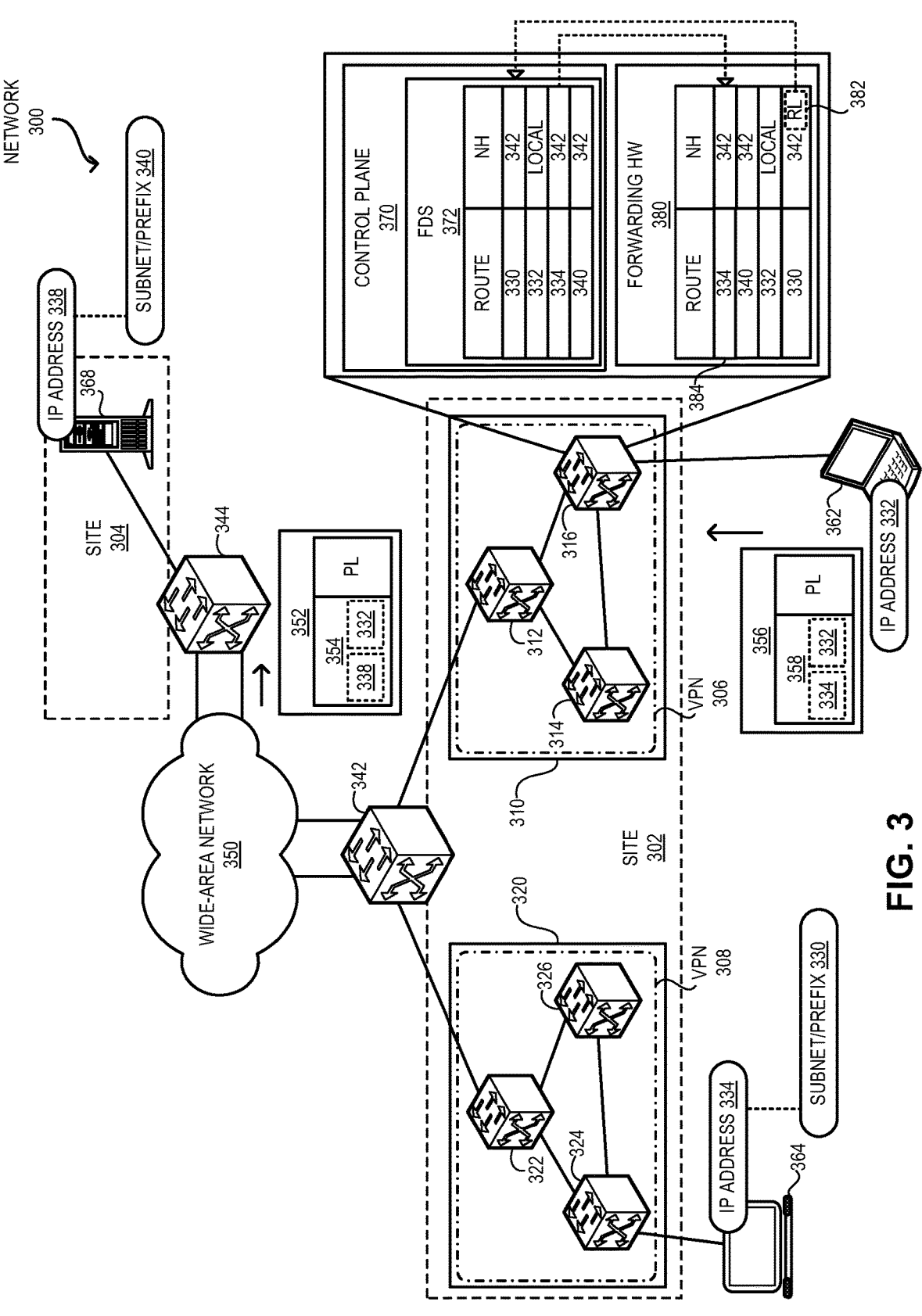
FIG. 3 illustrates an example of efficiently programming route information in the forwarding hardware of a network device in a multi-fabric overlay network, in accordance with an aspect of the present application.

FIG. 3 illustrates an example of efficiently programming route information in the forwarding hardware of a network device in a multi-fabric overlay network, in accordance with an aspect of the present application. An overlay network 300 can include a number of network and end devices, and may include heterogeneous network components, such as layer-2 and layer-3 hops, and tunnels. In some examples, network 300 can be an Ethernet, InfiniBand, or other networks, and may use a corresponding communication protocol, such as IP, FCOE, or other protocol. Network 300 can be distributed among multiple sites 302 and 304, which can be different sites of an enterprise network. Network 300 can include a plurality of distributed tunnel fabrics 310 and 320 at site 302. Hence, network 300 can be a multi-fabric network. Fabric 310 can include network devices 312, 314, and 316; and fabric 320 can include network devices 322, 324, and 326. A respective network device in a respective fabric can be associated with a MAC address and an IP address. In a respective fabric of network 300, network devices can be coupled to each other via a tunnel.

Network devices of a respective fabric in network 300 may include one or more meshes of tunnels. Examples of a tunnel can include, but are not limited to, VXLAN, GRE, NVGRE, Geneve, IPsec, MPLS, and GUE. The tunnels in a fabric can be formed over an underlying network (or an underlay network). A respective pair of network devices in the underlying network can be a BGP peer. A VPN 306, such as an EVPN, can be deployed over fabric 310. Similarly, a VPN 308 can be deployed over fabric 320. Network devices 312 and 322 can be gateway devices for fabrics 310 and 320, respectively. One or more of network devices 312 and 322 can be DVS. The DVS can be associated with one or more virtual addresses (e.g., a virtual IP address and/or a virtual MAC address).

A border device 342 can be shared among fabrics 310 and 320. Hence, border device 342 can facilitate external communication from site 302 via WAN 350. Network 300 can also include network device 344 which can facilitate communication with border device 342 via network 350. For example, border devices 342 and 344 can facilitate communication between sites 302 and 304 via network 350. In network 300, border device 342 can be coupled to border device 344 via respective inter-fabric tunnels through network 350. Hence, border device 342 can be coupled to fabrics 310 and 320 (e.g., via network devices 312 and 322, respectively) via respective inter-fabric tunnels. To facilitate the forwarding of the packet, routes for intra-fabric tunnels can be determined using iBGP, and routes for inter-fabric tunnels be determined using eBGP.

Network devices 314 and 316 can facilitate access to fabric 310 to a number of hosts. Similarly, network devices 324 and 326 can facilitate access to fabric 320 to a number of hosts. For example, network devices 316 and 324 can be coupled to hosts 362 and 364, respectively. Hosts 362 and 364 can be allocated with IP addresses 332 and 334, respectively. In network 300, the routing protocol instance of a respective network device, can be incorporated into a control plane, such as control plane 370 of network device 316. A host 368, which is associated with IP address 338, can be deployed in site 304. Host 368 can be accessible via border device 344. In this example, IP address 334 can belong to prefix 330, and IP address 338 can belong to prefix 340. If host 364's IP address 334 is Q.L.M.N, prefix 330 can then be Q.L. M.0/24. Since prefix 330 can represent its corresponding subnet, prefix 330 and subnet 330 can be used interchangeably.

During operation, network device 316 can store host route 334 in FDS 372 with border device 342 as the next-hop device. In addition, network device 316 can store prefix routes 330 and 340 in FDS 178 and program them into forwarding hardware 380 (e.g., in respective TCAM entries) with border device 342 as the next-hop device. Prefix route 330 can be programmed in forwarding hardware 380 with a rule 382. Rule 382 can indicate that if the destination IP address of a packet matches IP address 334, the IP address should be looked up in FDS 378 in control plane 370. Because prefix route 340 is an external route, prefix route 340 can be programmed in forwarding hardware 380 without the rule. Because host 362 is coupled to network device 316, the entry for host route 332 can include "LOCAL" as the next-hop device in both FDS 372 and forwarding hardware 380.

When network device 316 receives a packet 352 from host 362, forwarding hardware 380 can inspect header 354 of packet 352. Header 354 can be an IP header with IP addresses 332 and 338 as source and destination addresses, respectively. Packet 352 may also include a payload. Destination IP address 338 can be matched against the entry comprising prefix route 340 in forwarding hardware 380. Accordingly, network device 316 can send packet 352 to border device 342, which can then forward packet 356 to border device 344 via WAN 350. Since there is no rule programmed in the entry, control plane 370 does not look up IP address 338 in FDS 372.

On the other hand, when network device 316 receives a packet 356 from host 362, forwarding hardware 380 can inspect header 358 of packet 356. Header 358 can be an IP header with IP addresses 332 and 334 as source and destination addresses, respectively. Destination IP address 334 can be matched against the entry comprising prefix route 330 in forwarding hardware 380. Accordingly, network device 316 can send packet 356 to border device 342, which can then forward packet 356 to fabric 120. Because of the match, rule 382 can also be triggered. Therefore, packet 356 (or header 358) can be promoted to control plane 370. IP address 334 can then be matched against the entry comprising host route 334 based on the longest-prefix match. The entry can then be programmed in forwarding hardware 380 in a corresponding entry 384. Entry 384 can also be a TCAM entry.

Network device 316 can also initiate a timer for entry 384 and forward subsequent packets destined to IP address 334 based on entry 384 in forwarding hardware 380. Even though destination IP address 334 in these packets can also match prefix route 330, host route 334 in entry 384 can provide the longest-prefix match in forwarding hardware 380. Upon determining a respective match for host route 334 in entry 384, the timer can be reset. If forwarding hardware 380 does not observe traffic for host route 334 for a predetermined period, the timer can expire. Forwarding hardware 380 can then remove entry 384. In this way, network device 316 can distinguish routes advertised from border device 342 and perform selective programming on the routes accordingly.

Figure 4A:
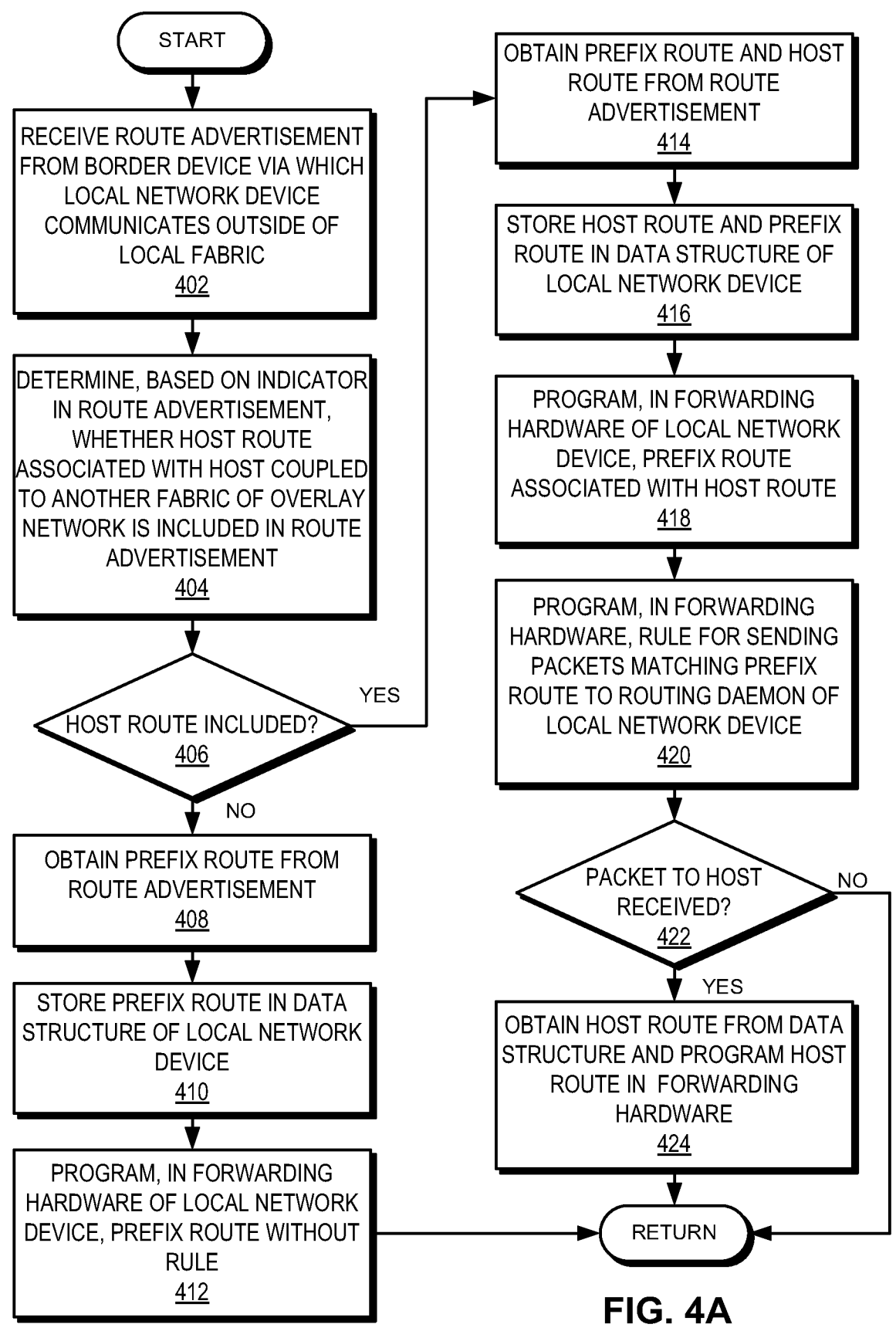
FIG. 4A presents a flowchart illustrating an example of a process of a network device selectively programming routes in the local forwarding hardware, in accordance with an aspect of the present application.

FIG. 4A presents a flowchart illustrating an example of a process of a network device selectively programming routes in the local forwarding hardware, in accordance with an aspect of the present application. During operation, the network device can receive a route advertisement from a border device via which the local network device communicates outside of the local fabric (operation 402). The route advertisement can be an overlay-route packet, such as an EVPN route update. The route advertisement can include an indicator that can indicate whether selective programming can be applicable to the advertised routes. Accordingly, the network device can determine, based on the indicator in the route advertisement, whether a host route associated with a host coupled to another fabric of the overlay network is included in the route advertisement (operation 404). When a border device advertises a route received via an external network (e.g., from a remote site via a WAN), the border device may only advertise a prefix route to the local sharing fabrics. As a result, the inclusion can indicate that the advertised host route corresponds to a host coupling another sharing fabric reachable via the border device.

The network device can then determine, based on the indicator, whether a host route is included in the route advertisement (operation 406). A set value of the indicator (e.g., a value of one) can indicate that a host route is included in the route advertisement. If a host route is not included in the route advertisement, the network device can obtain the prefix route from the route advertisement (operation 408) and store the prefix route in a data structure of the local network device (operation 410). The data structure can be the FDS maintained in the control plane (e.g., in the software) of the network device. The network device can also program, in the forwarding hardware of the local network device, the prefix route without a rule (operation 414). Because the advertised route can be a prefix route corresponding to an external network, the network device may not program a rule to promote to the control plane.

On the other hand, if a host route is included in the route advertisement, the network device can obtain the prefix route and the host route from the route advertisement (operation 414). The network device can store a respective route in the control plane so that the route updates obtained by a routing daemon of the network daemon can be incorporated in the stored routes. Accordingly, the network device can store the prefix route and the host route in the data structure of the local network device (operation 416). The presence of the host route can indicate that selective programming can be applicable to the advertised routes.

Therefore, the network device can program, in the forwarding hardware of the local network device, the prefix route (operation 414) and a rule for sending packets matching the prefix route to the routing daemon of the local network device (operation 420). The rule can allow an IP address of a packet matching the prefix route to be promoted to the routing daemon in the control plane and allow the corresponding host route to be programmed in the forwarding hardware. Hence, the network device can determine whether a packet destined to the host is received (operation 422). Because the destination IP address of the packet can match the prefix route, the packet (or its header) can be promoted to the routing daemon according to the rule. Hence, the network device can obtain the host route from the data structure and program the host route in the forwarding hardware of the local network device (operation 424).

Figure 4B:
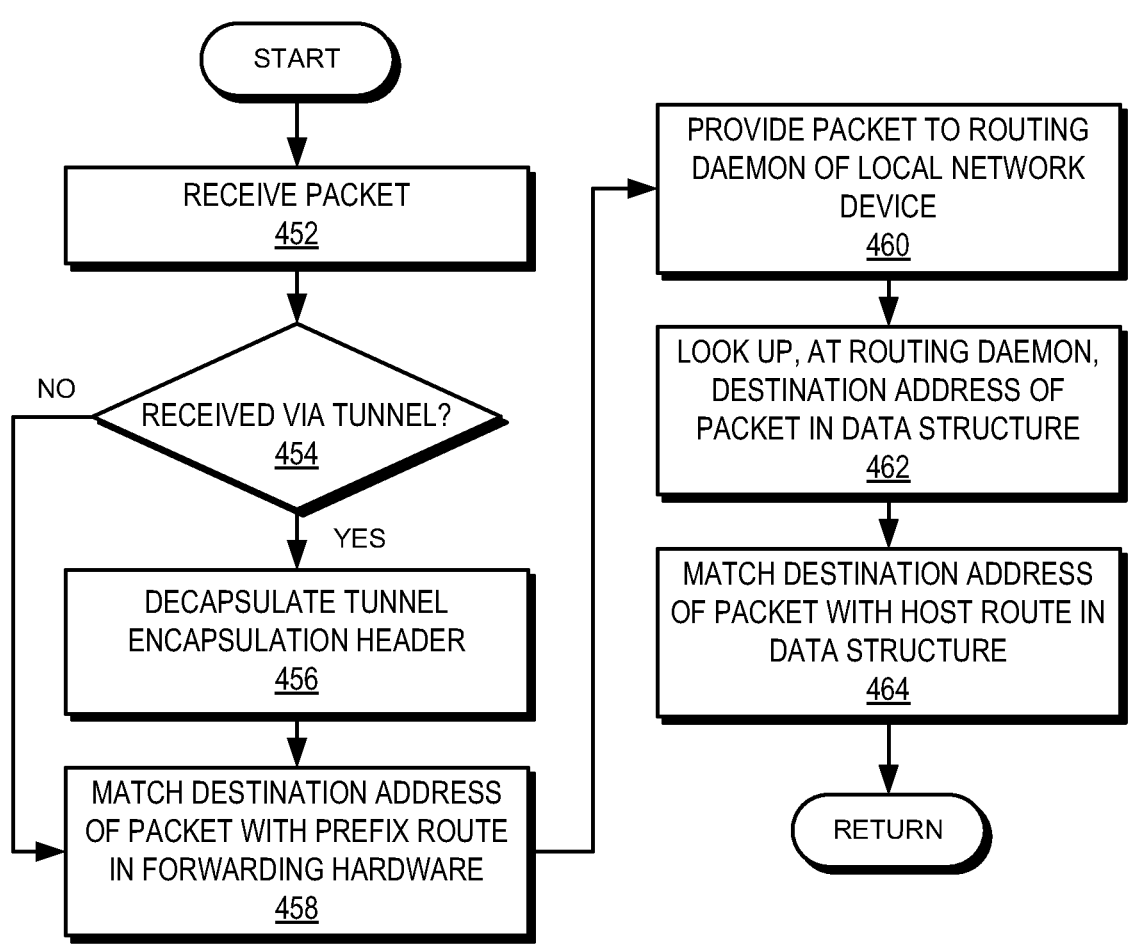
FIG. 4B presents a flowchart illustrating an example of a process of a network device programming a host route for a packet in the local forwarding hardware, in accordance with an aspect of the present application.

FIG. 4B presents a flowchart illustrating an example of a process of a network device programming a host route for a packet in the local forwarding hardware, in accordance with an aspect of the present application. During operation, the network device can receive a packet (operation 452). Since the network device can be in an overlay network, the network device can be coupled to other network devices via corresponding tunnels. In addition, if the network device is an access device, the network device can also be coupled to one or more hosts via corresponding edge ports. Therefore, the packet can be received from a host via an edge port or from another network device via a tunnel. Accordingly, the network device can determine whether the packet is received via a tunnel (operation 454).

If the packet is received via a tunnel, the packet can be encapsulated with a tunnel encapsulation header (e.g., a VXLAN header). The network device can then decapsulate the tunnel encapsulation header (operation 456). Based on the decapsulation, the network device can obtain the inner packet. If the packet is not received via a tunnel (i.e., received via an edge port) (operation 454) or upon decapsulating the header (operation 456), the network device can match the destination address of the packet, which can be an IP address, with a prefix route in the forwarding hardware of the local network device (operation 458).

Since the destination address matches the prefix route, the corresponding rule can be triggered. Hence, the network device can provide the packet to the routing daemon of the local network device (operation 460). The routing daemon can maintain a data structure, such as the FDS, that can store a respective active route received by the routing daemon. The network device can then look up, at the routing daemon, the destination address of the packet in the data structure (operation 462). The looking-up operation can include finding a longest-prefix match for the destination address. Hence, the network device can match the destination address of the packet with the host route in the data structure (operation 464). Here, the address indicated by the host route can be in the subnet represented by the prefix route.

Figure 5:
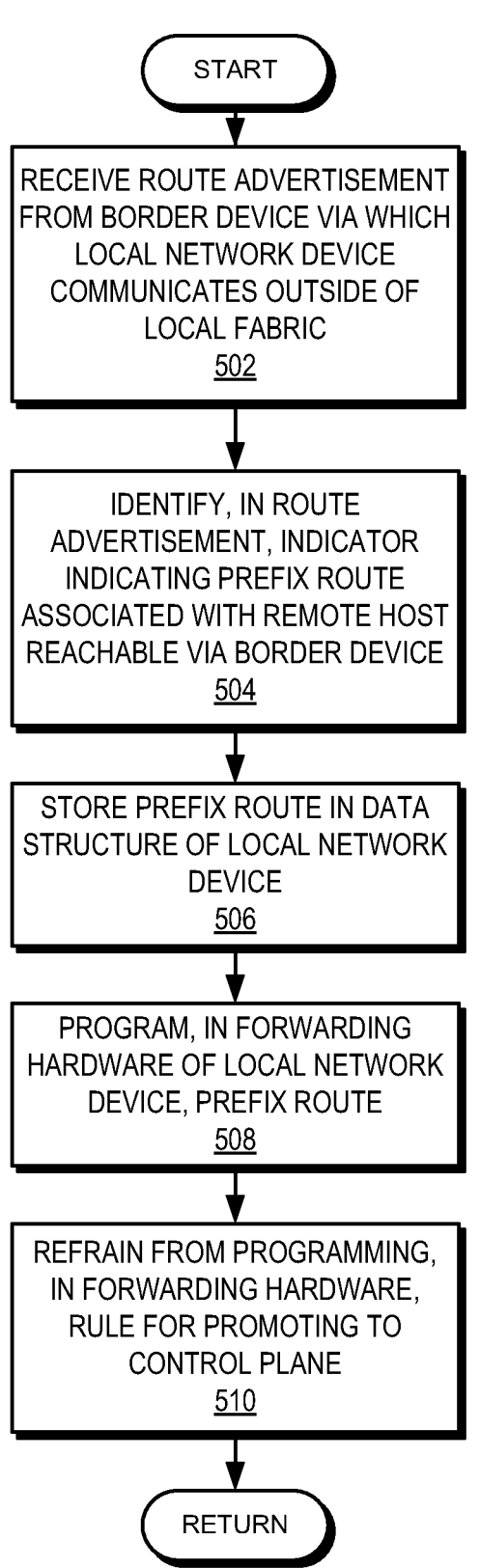
FIG. 5 presents a flowchart illustrating an example of a process of a network device programming a prefix route reachable via a border device in the local forwarding hardware, in accordance with an aspect of the present application.

FIG. 5 presents a flowchart illustrating an example of a process of a network device programming a prefix route reachable via a border device in the local forwarding hardware, in accordance with an aspect of the present application. During operation, the network device can receive a route advertisement from a border device via which the local network device communicates outside of the local fabric (operation 502). The border device can be shared by one or more other sharing fabrics at a local site. The network device can then identify, in the route advertisement, an indicator indicating a prefix route associated with a remote host reachable via the border device (operation 504). Under such circumstances, the indicator may have an unset value (e.g., a value of zero), which indicates that a host route is not included in the route advertisement.

The network device can then obtain the prefix route from the route advertisement. Subsequently, the network device can store the prefix route in a data structure of the local network device (operation 506). The data structure can be the FDS maintained in the control plane of the local network device. A respective route can be inserted into the data structure by the routing daemon of the local network device. The network device can also program, in the forwarding hardware of the local network device, the prefix route (operation 508). Because the route can be an external route, the network device can refrain from programming, in the forwarding hardware, the rule for promoting to the control plane (operation 510).

Figure 6:
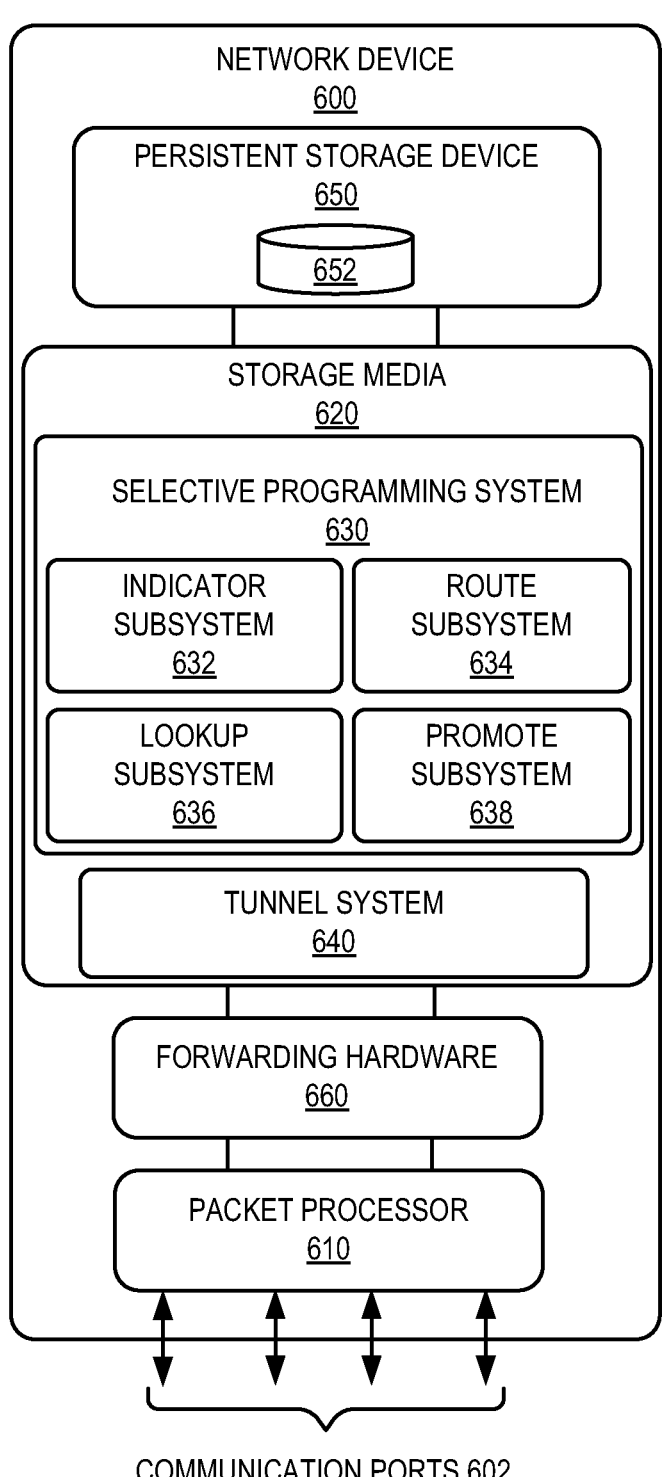
FIG. 6 illustrates an example of a network device supporting selective programming of the forwarding hardware, in accordance with an aspect of the present application.

FIG. 6 illustrates an example of a network device supporting selective programming of the forwarding hardware, in accordance with an aspect of the present application. In this example, a network device 600, which can also be referred to as a network device 600, can include a number of communication ports 602, a packet processor 610, and a persistent storage device 650. Packet processor 610 can extract and process header information from the received packets. Packet processor 610 can identify a network device identifier (e.g., a MAC address and/or an IP address) associated with network device 600 in the header of a packet. Network device 600 can include a storage media 620. In some examples, storage media 620 can include a set of volatile memory devices (e.g., dual in-line memory module (DIMM)).

Network device 600 can also include forwarding hardware 660 (e.g., processing hardware of network device 600, such as its application-specific integrated circuit (ASIC) chips), which includes information based on which network device 600 processes packets (e.g., determines output ports for packets). Forwarding hardware 660 can include one or more units of TCAMs. The TCAMs in forwarding hardware 660 can store forwarding and routing entries determined by the control plane of network device 600. The entries can allow network device 600 to forward data packets. Therefore, forwarding hardware 660 can be programmed by the control plane and facilitate at least a subset of operations of the data plane of network device 600.

Communication ports 602 can include inter-device communication channels for communication with other network devices and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Network device 600 can maintain a database 652 (e.g., in storage device 650). Database 652 can be a relational database and may run on one or more Database Management System (DBMS) instances. Database 652 can store information associated with the routing, configuration, and interfaces of network device 600. Database 652 may store the FDS and RDS for network device 600. Storage media 620 can include instructions associated with a tunnel system 640. Tunnel system 640 can include instructions that can allow network device 600 to operate as a tunnel endpoint in a tunnel fabric. To operate as a tunnel endpoint, tunnel system 640 may establish a tunnel with one or more remote network devices. Storage Media 620 can include instructions associated with a selective programming system 630 that can allow network device 600 to selectively program host routes in forwarding hardware 660.

Selective programming system 630 can include an indicator subsystem 632, a prefix route subsystem 634, a lookup subsystem 636, and a promote subsystem 638. Indicator subsystem 632 can include instructions to identify an indicator in a route advertisement (e.g., in an overlay-route packet) and determine whether the route advertisement includes a host route. Route subsystem 634 can include instructions to obtain host and prefix routes from a route advertisement and program them in a data structure (e.g., in the FDS) in the control plane of network device 600. Route subsystem 634 can include instructions to program a prefix route in forwarding hardware 660 with a rule to promote a matched packet to the control plane if the indicator indicates the presence of a corresponding host route.

On the other hand, route subsystem 634 can include instructions to program a prefix route in forwarding hardware 660 without the rule if the indicator indicates that a host route is not included in the route advertisement. Lookup subsystem 636 can include instructions to determine a match between a destination IP address of a packet and a prefix route programmed in forwarding hardware 660. Promote subsystem 638 can include instructions to, upon finding a match, promote the packet (or its header) to the control plane. Lookup subsystem 636 can then include instructions to determine a match between the destination IP address of the packet and a host route stored in the data structure. Route subsystem 634 can then include instructions to program the host route in forwarding hardware 660.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a network device in a first fabric of an overlay network. During operation, the network device can receive a route advertisement from a border device via which the network device communicates outside of the first fabric. The network device can determine, based on an indicator in the route advertisement, whether a host route associated with a host coupled to a second fabric of the overlay network is included in the route advertisement. If the indicator indicates that the host route is included in the route advertisement, the network device can store the host route in a data structure on the network device. The network device can also program, in the local forwarding hardware, a prefix route associated with the host route. If the network device detects a packet destined to the host device, the network device can program the host route in the forwarding hardware.

In a variation on this aspect, the network device can detect the packet destined to the host device by matching a destination address of the packet with the prefix route in the forwarding hardware and with the host route in the data structure.

In a further variation, the network device can provide the packet to a routing daemon of the network device. The routing daemon can then look up the destination address in the data structure.

In a variation on this aspect, the route advertisement can be included in an Ethernet Virtual Private Network (EVPN) extended community, which encodes the host route for advertising in the overlay network.

In a further variation, the indicator can be included in a field at a predefined location in the EVPN extended community.

In a variation on this aspect, the network device can obtain the prefix route from the route advertisement.

In a variation on this aspect, the network device can identify, in a second route advertisement, a second indicator indicating a second prefix route associated with a second host reachable via the border device. The network device can then program the second prefix route in the forwarding hardware.

In a variation on this aspect, the network device can program the prefix route in the forwarding hardware by programming, in the forwarding hardware, a rule for providing packets matching the prefix route to a routing daemon of the network device.

In a variation on this aspect, the network device can receive the packet via a first tunnel between the network device and the border device, which maintains a second tunnel with the second fabric.

The data structures and code described in this detailed description are typically stored on a computer-readable storage medium, which may be any device or medium that can store code and/or data for use by a computer system. The computer-readable storage medium can include, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and codes and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block, a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
receiving, by a network device in a first fabric of an overlay network, a route advertisement from a border device via which the network device communicates outside of the first fabric, the route advertisement including a prefix route for a host device connected to a second fabric of the overlay network;
determining, by the network device and based on an indicator in the route advertisement, whether a host route corresponding to the prefix route and associated with the host device is included in the route advertisement, the indicator settable by the border device to a first value to indicate that the host route is included in the route advertisement, and to a second value to indicate that the host route is not included in the route advertisement;
based on determining that the host route is included in the route advertisement responsive to the indicator being set to the first value:
  storing, by the network device, the host route in an entry of a data structure on the network device, the entry of the data structure further indicating the border device as a next-hop device for forwarding a packet destined to the host device and received at the network device; and
  programming, by the network device, the prefix route in an entry of forwarding hardware of the network device, the entry of the forwarding hardware further indicating the border device as the next-hop device.

2. The method of claim 1, further comprising:
receiving, at the network device, a first packet destined to the host device;
matching, by the network device, a destination address of the first packet with the prefix route in the entry of the forwarding hardware; and
matching, by the network device, the destination address with the host route in the entry of the data structure.

3. The method of claim 2, further comprising:
providing the first packet to a routing daemon of the network device; and
looking up, by the routing daemon, the destination address in the data structure.

4. The method of claim 2, further comprising:
based on the entry of the data structure indicating the border device as the next-hop device, forwarding, by the network device, the first packet to the border device.

5. The method of claim 1, wherein the route advertisement comprises an Ethernet Virtual Private Network (EVPN) extended community that encodes the host route and includes the indicator.

6. The method of claim 5, wherein the indicator is included in a field at a predefined location in the EVPN extended community.

7. The method of claim 1, wherein the forwarding hardware comprises a ternary content-addressable memory (TCAM), and the prefix route is programmed in an entry of the TCAM.

8. The method of claim 1, wherein the programming of the prefix route in the forwarding hardware comprises programming, in the entry of the forwarding hardware, a rule specifying a lookup of the data structure for packets containing destination addresses matching the prefix route in the entry of the forwarding hardware, the method further comprising:
receiving, at the network device, a first packet containing a destination address of the host device;
based on determining that the destination address matches the prefix route in the entry of the forwarding hardware, applying, by the network device, the rule to trigger a lookup of the data structure using the destination address; and
matching, by the network device, the destination address to the host route in the entry of the data structure.

9. The method of claim 8, further comprising:
after the matching of the destination address to the host route in the entry of the data structure, adding, by the network device, a further entry to the forwarding hardware, the further entry containing the host route and indicating the border device as the next-hop device.

10. The method of claim 9, further comprising:
receiving, at the network device, a further packet destined to the host device; and
forwarding, by the network device, the further packet based on matching a destination address in the further packet to the host route in the further entry of the forwarding hardware.

11. A non-transitory computer-readable storage medium comprising instructions that when executed cause a network device in a first fabric of an overlay network to:
receive, at the network device, a route advertisement from a border device via which the network device communicates outside of the first fabric, the route advertisement including a prefix route for a host device connected to a second fabric of the overlay network;
determine, based on an indicator in the route advertisement, whether a host route corresponding to the prefix route and associated with the host device is included in the route advertisement, the indicator settable by the border device to a first value to indicate that the host route is included in the route advertisement, and to a second value to indicate that the host route is not included in the route advertisement;
based on determining that the host route is included in the route advertisement responsive to the indicator being set to the first value:
  store the host route in an entry of a routing data structure on the network device, the entry of the routing data structure further indicating the border device as a next-hop device for forwarding a packet destined to the host device and received at the network device; and
  program the prefix route in an entry of forwarding hardware of the network device, the entry of the forwarding hardware further indicating the border device as the next-hop device.

12. The non-transitory computer-readable storage medium of claim 11, wherein the route advertisement comprises an Ethernet Virtual Private Network (EVPN) extended community that encodes the host route and includes the indicator.

13. The non-transitory computer-readable storage medium of claim 12, wherein the indicator is included in a field at a predefined location in the EVPN extended community.

14. The non-transitory computer-readable storage medium of claim 11, wherein the instructions when executed cause the network device to:

program, in the entry of the forwarding hardware, a rule specifying a lookup of the routing data structure for packets containing destination addresses matching the prefix route in the entry of the forwarding hardware;

receive, at the network device from the host device, a first packet containing a destination address;

based on determining that the destination address matches the prefix route in the entry of the forwarding hardware, apply the rule to trigger a lookup by the network device of the routing data structure using the destination address; and match the destination address to the host route in the entry of the routing data structure.

15. The non-transitory computer-readable storage medium of claim 14, wherein the instructions when executed cause the network device to:

in response to the matching of the destination address to the host route in the entry of the routing data structure, add a further entry to the forwarding hardware, the further entry containing the host route and indicating the border device as the next-hop device.

16. The non-transitory computer-readable storage medium of claim 15, wherein the instructions when executed cause the network device to:

receive, at the network device, a further packet destined to the host device; and forward, by the network device, the further packet based on matching a destination address in the further packet to the host route in the further entry of the forwarding hardware.

17. The non-transitory computer-readable storage medium of claim 14, wherein the forwarding hardware comprises a ternary content-addressable memory (TCAM), and the prefix route and the rule are programmed in an entry of the TCAM.

18. The non-transitory computer-readable storage medium of claim 11, wherein the route advertisement is received through a first tunnel between the network device and the border device, and wherein the border device maintains a second tunnel with the second fabric.

19. A network device, comprising:

a processor;

forwarding hardware; and a non-transitory computer-readable storage medium storing instructions that when executed on the processor cause the network device in a first fabric to:

receive, at the network device, a route advertisement from a border device via which the network device communicates outside of the first fabric, the route advertisement including a prefix route for a host device connected to a second fabric;

determine, based on an indicator in the route advertisement, whether a host route corresponding to the prefix route and associated with the host device is included in the route advertisement, the indicator settable by the border device to a first value to indicate that the host route is included in the route advertisement, and to a second value to indicate that the host route is not included in the route advertisement;

based on determining that the host route is included in the route advertisement responsive to the indicator being set to the first value:

store the host route in an entry of a data structure on the network device, the entry of the data structure further indicating the border device as a next-hop device for forwarding a packet destined to the host device and received at the network device; and program the prefix route in an entry of forwarding hardware of the network device, the entry of the forwarding hardware further indicating the border device as the next-hop device.

20. The network device of claim 19, wherein the instructions when executed cause the network device to:

program, in the entry of the forwarding hardware, a rule specifying a lookup of the data structure for packets containing destination addresses matching the prefix route in the entry of the forwarding hardware;

receive, at the network device from the host device, a first packet containing a destination address;

based on determining that the destination address matches the prefix route in the entry of the forwarding hardware, apply the rule to trigger a lookup by the network device of the data structure using the destination address;

match the destination address to the host route in the entry of the data structure; and after the matching of the destination address to the host route in the entry of the data structure, add a further entry to the forwarding hardware, the further entry containing the host route and indicating the border device as the next-hop device.

* * * * *